July 3, 1951  A. P. WATERSON  2,559,138
DUPLICATING ATTACHMENT FOR LATHES
Filed June 10, 1946  4 Sheets-Sheet 1

INVENTOR
Arthur P. Waterson
BY
ATTORNEY

July 3, 1951  A. P. WATERSON  2,559,138
DUPLICATING ATTACHMENT FOR LATHES
Filed June 10, 1946  4 Sheets-Sheet 3

Arthur P. Waterson
INVENTOR.

BY
ATTORNEY.

July 3, 1951

A. P. WATERSON 2,559,138

DUPLICATING ATTACHMENT FOR LATHES

Filed June 10, 1946

Arthur P. Waterson
INVENTOR

BY
Philip A. Terrell
ATTORNEY

Patented July 3, 1951

2,559,138

UNITED STATES PATENT OFFICE 2,559,138

DUPLICATING ATTACHMENT FOR LATHES

Arthur P. Waterson, Tulsa, Okla., assignor to The R. K. Le Blond Machine Tool Company, Cincinnati, Ohio, a corporation of Delaware Application June 10, 1946, Serial No. 675,522

4 Claims. (Cl. 82—14)

The invention relates to duplicating attachments for lathes, and has for its object to provide a device of this kind, adapted to be attached to a lathe carriage, and to travel longitudinally therewith, and provided with a cross slide having a cutting element thereon, said slide being also controlled in its movement towards and away from the axis of the work by a template engaging member, and the slide further controlled hydraulically in its inward and outward movement for holding the cutting tool to the work, and avoiding chattering.

This application is related to co-pending application Serial No. 736,136 filed March 21, 1947.

A further object is to mount the tool slide in a sub-compound on the carriage, and to provide the sub-compound with a rotatably adjustable plate having a template holding slide channel therein, so the sub-compound can be adjusted to various angular positions in the plane of the template holder, and moved inwardly and outwardly with the adjustment of the cross feed carriage.

A further object is to provide the lathe way on the carriage side of the lathe with a template holding bracket, in one end of which a template holder is anchored, against longitudinal movement, but allowed to move inwardly in parallel relation to the adjacent lathe way.

A further object is to provide means whereby the sub-compound may be adjusted at various angles to the axis of the work in the lathe, and the work holder simultaneously adjusted inwardly or outwardly by the adjustment of the sub-compound on the cross feed carriage.

A further object is to provide spring means for normally maintaining a feeler finger of the hydraulic unit against the template contour, as the lathe carriage is moved by the feed screw, so the cutting tool will follow the same contour on the work in the lathe.

Still another object of this invention is to eliminate exible tubes, conduits, or pipes inter-connecting fluid pressure between the traced control valve and the actuating cylinder for the tool slide.

It is also an object to provide a tracer control mechanism for lathe wherein the tracer valve is an integral part of the actuating cylinder for the tool slide.

Another object of this invention is to provide a duplicating attachment for a lathe compound rest which cooperates with a template and is so arranged that the compound rest can be set in any desired angular position relative to the work spindle axis of the lathe.

It is also an object to provide, in a duplicating attachment for lathe, an arrangement wherein the relative position of the template and tracer finger is maintained for any angular setting of the compound rest.

It is also an object of this invention to provide in a duplicating attachment mounted on the carriage of a lathe a template mechanism arranged to maintain proper operative control relationship with a tracer control valve of the attachment for any position of cross slide adjustment.

It is still another object of this invention to provide an improved duplicating attachment for compound rest tool slide of a lathe wherein the template for actuating the tool slide moves in unison with the cross slide during cross slide adjustment.

And a still further object of this invention is to provide, in a duplicating attachment for lathes, a control template for the attachment which is supported and guided by the compound rest and bed of the lathe in such a manner that the template moves transverse of the lathe in response to the cross slide adjustments and remains stationary relative to the bed of the lathe during longitudinal movement of the carriage on the lathe bed.

And another object of this invention is to provide, in a template control mechanism for a duplicating attachment for lathe, a mounting arrangement for the template such that the bed of the lathe supports the template against longitudinal movement of the bed and automatically moves the template transversely of the bed upon movement of the cross slide while at all times maintaining a predetermined proper relationship of the template to the duplicating attachment mechanism.

With the above and other objects in view, the invention resides in the combination and arrangement of parts as hereinafter set forth, shown in the drawings, described and claimed, it being understood that changes in the precise embodiment of the invention may be made within the scope of what is claimed, without departing from the spirit of the invention.

Figure 1:
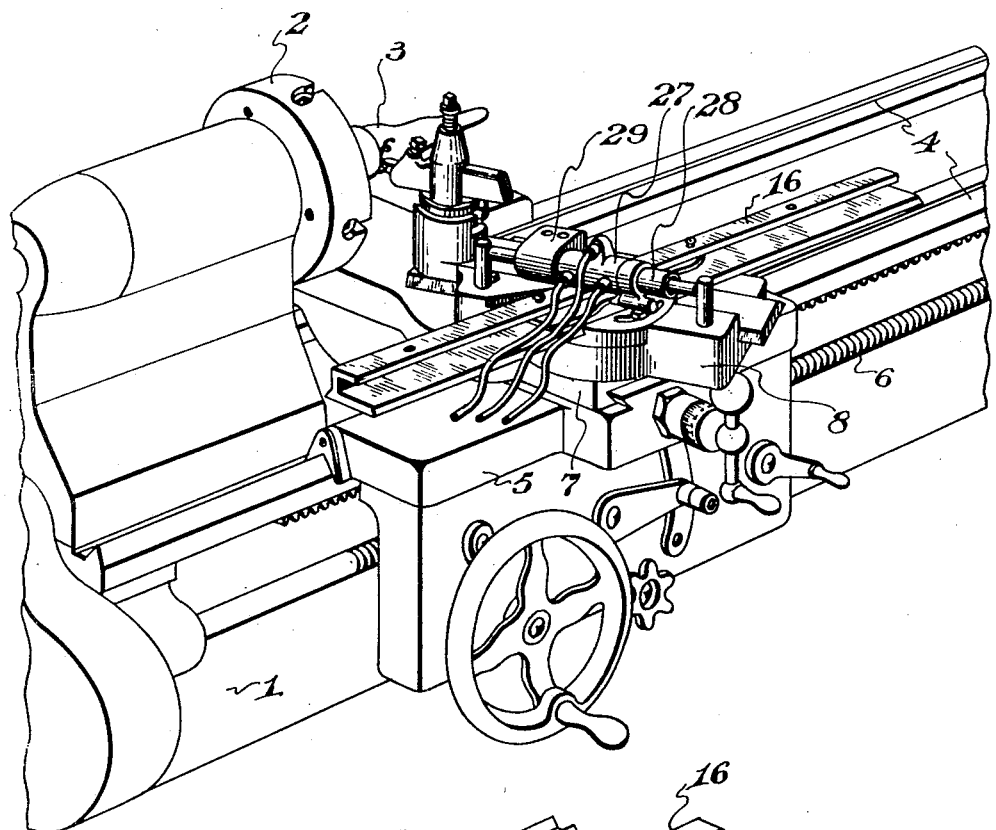
Figure 1 is a perspective view of the tool attachment, showing the same applied to a conventional form of lathe.
Figure 2:
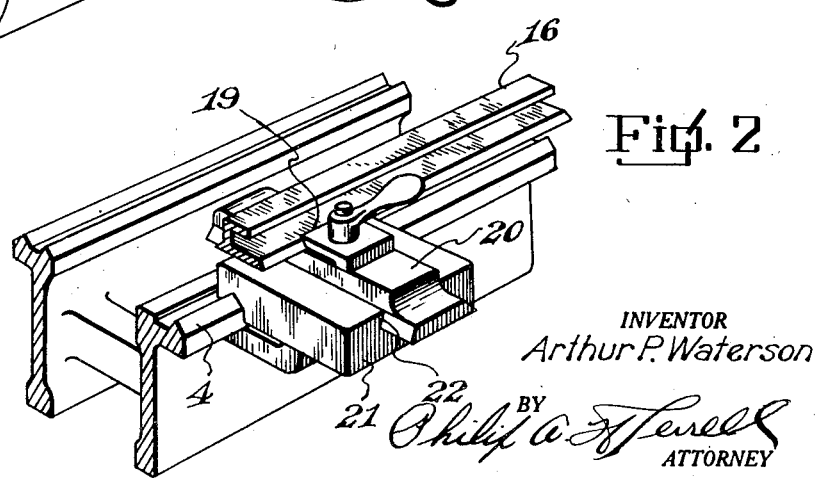
Figure 2 is a perspective view of the clamping member for clamping one end of the template holder to one of the lathe ways, so it will move in parallel relation to the lathe way.

Referring to the drawings, the numeral 1 designates a conventional form of lathe, 2 the chuck, and 3 the work carried by the chuck. Lathe 1 is provided with spaced parallel bed ways 4, on which ways is mounted a longitudinally movable carriage 5, of conventional construction, and which carriage is moved longitudinally by means of the feed screw 6. The upper side of carriage 5 is provided with the usual cross feed carriage 7, which carries a conventional compound. In the present case the regular compound rest is removed and a compound rest bottom swivel slide or sub-compound 8 is mounted on the cross feed carriage or cross slide 7, and rigidly held thereon in the desired adjusted position by bolts extending through apertures 9.

Figure 3:
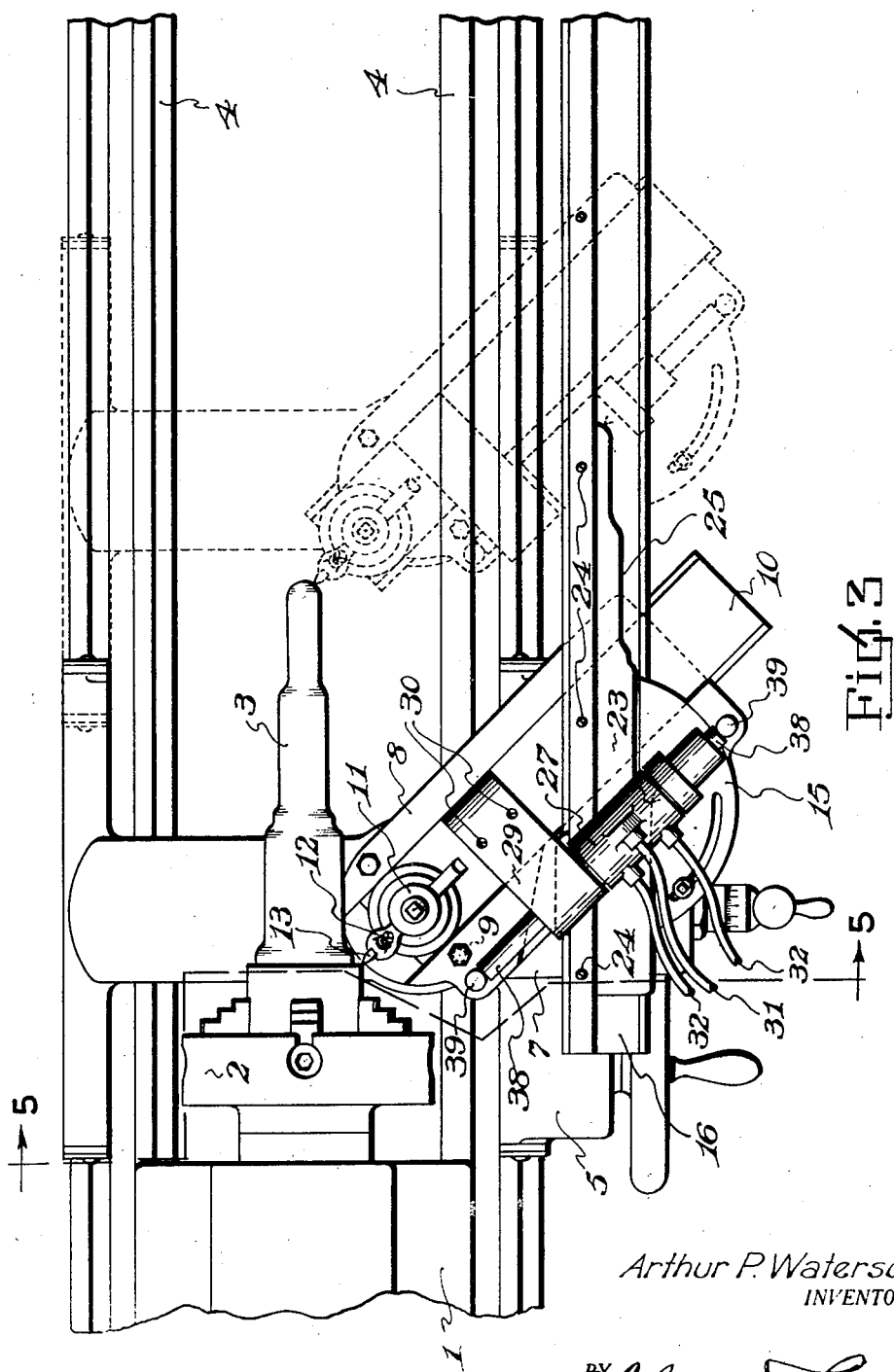
Figure 3 is a top plan view of the tool holder attachment, showing the same applied to a lathe.

It will be noted, by referring to Figure 3, that the sub-compound is at substantially forty-five degrees to the axis of the work 3 and carriage and cross slide movements. Slidably mounted in the sub-compound 8 is a tool slide 10, having a tool receiving post 11 for the reception of the tool holder 12, having a cutting tool 13.

Pivotally mounted at 14 on the sub-compound 8, to one side thereof, is a rotatably adjustable template holder plate 15, in which is slidably mounted one end of the template holder 16, and the plate 15 is adapted to be rigidly clamped in adjusted position by means of the bolt 17, extending through a concentric slot 18, and into the compound 8. The other end of the template holder 16 is clamped at 19 in a template cross slide 20, carried by a clamping member 21, clamped on the operator's side, and to one of the bed ways 4. With the swivel plate 15 adjusted with its guideway for the template holder parallel to the bed ways 4, as the carriage 5 is reciprocated the template holder 16 is maintained in parallel relation to the ways 4. The slide 20 is free to move at right angles to the bed ways 4 in the slide channel 22 of the clamp 21, so as to prevent binding of the template holder in the plate 15 in the event the guideway in the plate is not adjusted exactly parallel to the bed ways 4. The template holder moves closer to the axis of the work 3 as successive cuts are taken from the periphery of the work 3 by adjustment of the cross slide 7, while maintaining parallel relation of the template holder to the axis of the work and the bed ways 4.

The template 23 is clamped in the template holder 16 by means of set screws 24, extending through the upper flange of the holder. It will be noted, referring to Figure 3, that the outer edge 25 of the template conforms in contour to the desired shape of the work 3, and during the reciprocation of the carriage, the slide 10 is controlled in its inward and outward movement by a feeler or tracer finger 26, which engages the edge 25 of the template, and which finger 26 is carried by a hydraulically controlled cylinder 27. The cylinder or tracer valve in the form of a sleeve 27, through pressure means, hereinafter set forth, controls an inner cylinder 28, having a bracket 29, which bracket is anchored at 30 to the tool slide 10, which carries the tool 13. Cylinder or sleeve valve 27 is provided with an intake connection 31, connected to a source of hydraulic power, and with exhaust connections 32. This hydraulic control positively maintains the tool in its cutting position with the feeler or tracer finger 26 in engagement with the outer edge of the template 23. It will be noted that the feeler finger 26 depends from and is formed integral with the sleeve valve 27, and the feeler finger is urged constantly towards the template edge by the expansion spring 33, clearly shown in Figure 6.

Figure 4:
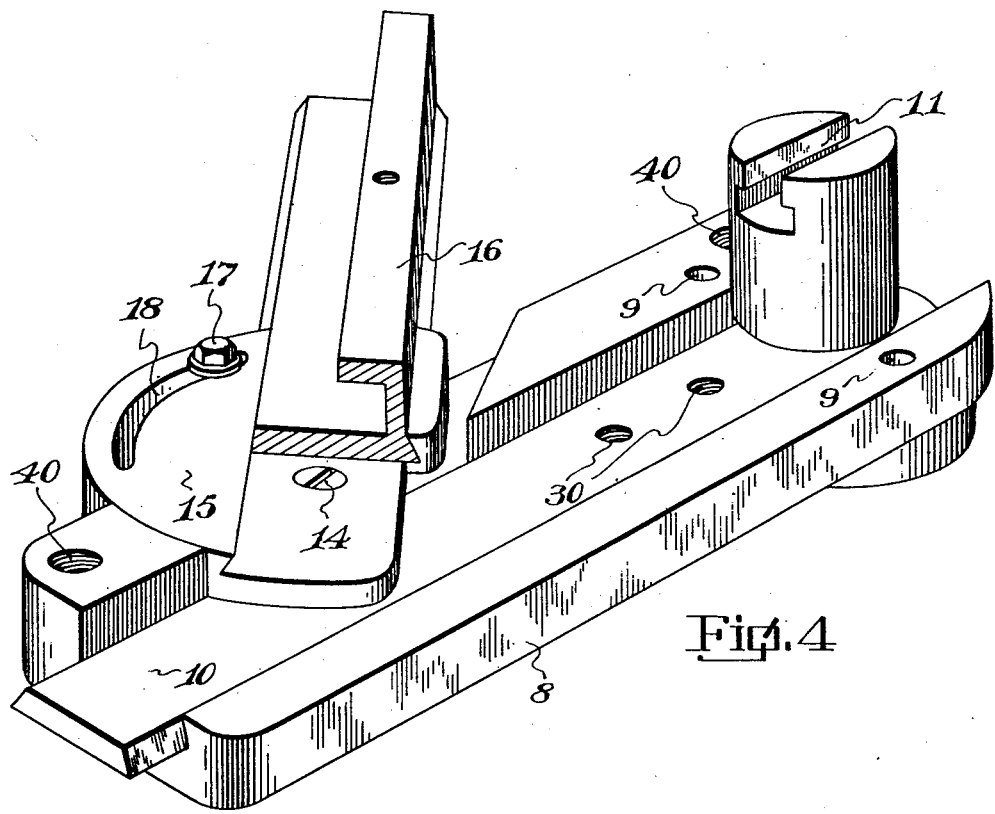
Figure 4 is a detail perspective view of the sub-compound, showing the adjustable plate, through which the template holder slides.
Figure 5:
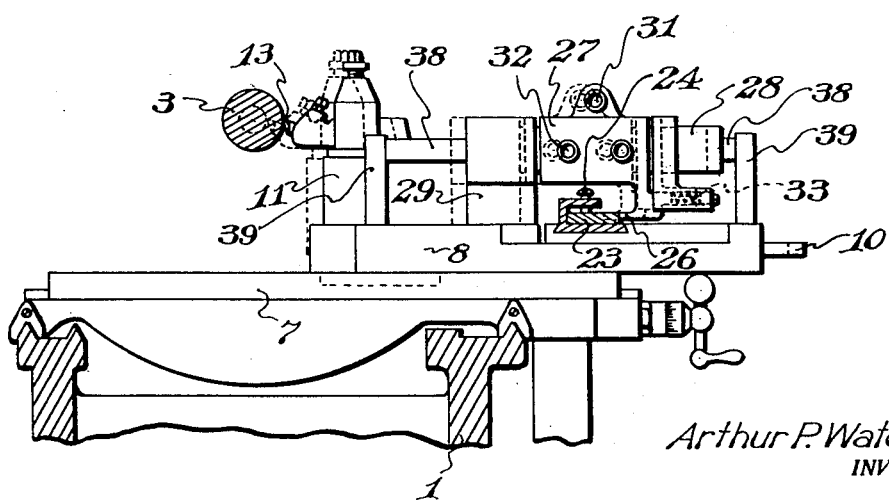
Figure 5 is a transverse sectional view taken on line 5—5 of Figure 3.

Sleeve valve 27 is slidably mounted on the cylinder 28, which cylinder is provided with chambers 34 and 35, which chambers have slidable therein pistons 36 and 37, the outer ends of which pistons terminate in piston rods 38, which engage the upstanding rigid posts 39, carried by sub-compound 8, at one side thereof, and which posts are preferably threaded into the apertures 40, shown in Figure 4.

During the operation of the hydraulic control, the pistons 36 and 37 do not move relative to each other, but there is a slight movement of the valve sleeve 27 on cylinder 28 for actuating or controlling the intake and discharge of fluid to and from the cylinder chambers 34 and 35. This movement of the valve 27 is extremely slight, and as a matter of fact is .006 of an inch, however the port openings, both intake and exhaust, have been exaggerated in the drawings, for purposes of illustration. The left exhaust port 41 is ⅔ open, while the right exhaust port is ⅓ open, as indicated at 42; while the intake ports 43 and 44 are respectively ⅓ and ⅔ open. Reduced to mathematics, the port 41 is .004" open, port 43, .002" open; port 44, .004" and port 42, .002" open. Applicant does not limit himself to these exact measurements, but they are sufficient for ordinary operation, and the subject matter of this hydraulic control is made the subject matter of application Serial No. 675,523, executed and filed on June 10, 1946, and now Patent No. 2,516,495, granted July 25, 1950.

Figure 6:
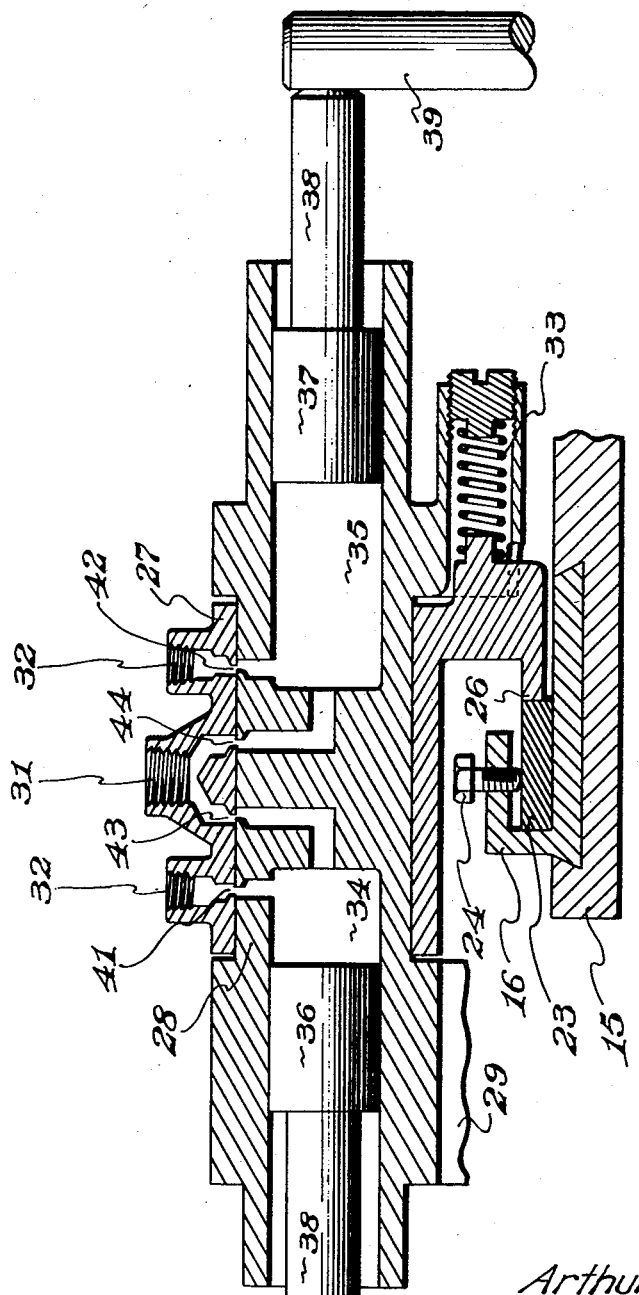
Figure 6 is a vertical longitudinal sectional view through the control cylinder.

The pinching or valving operation is as follows. When the exhaust port 41 is ⅔ open, as shown in Figure 6, the intake port 43 is ⅓ open. This permits circulation of liquid, under pressure, to enter and leave the left hand cylinder with reduced back pressure, and at the same time the intake port of the right hand of the cylinder, and designated by the numeral 44 is ⅔ open and its exhaust port is only ⅓ open. The pinching in of the exhaust port on the right hand cylinder sets up a back pressure and causes the cylinder unit to travel to the left, because the pressure in the left hand cylinder is not as great as in the right hand one. When the feeler contacts the template, the sliding valve 27 can no longer travel to the left, and as the cylinder unit is still traveling, the ports will change to a point where each cylinder exhaust and intake ports are equal. Then the same amount of liquid enters each, and the same amount being exhausted from each, the unit will stand still until some depression or projection of the template 23 is encountered by the feeler finger 26 during the longitudinal movement of the carriage. In other words the feeler finger 26 in contact with the template, pulls or pushes the valve 27 and the changes in the ports caused thereby moves the cylinder unit and the tool slide 10 back and forth by the pressure introduced into one cylinder or the other. consequently the cylinder 28 imparts the same movement to the cutting tool 13 in accordance with the contour of the template 23. The tendency of the unit is to maintain equal pressure in both cylinders, and the unit feels itself one way and then the other, and in so doing follows the contour of the template to cause the tool to duplicate and follow the same path. When the feeler finger 26 is traveling along the template on a straight surface, the pressure in each cylinder will be identical, and the cylinder unit will be held rigid between each post 39. Spring 33 is strong enough to slide the valve 27 and hold the feeler in contact with the template at all times, From the above it will be seen that a hydraulically controlled duplicating device for lathes is provided, which is simple in construction, positive in its operation, and one wherein the template contour will be positively followed by the tool, and that successive cuts can be taken from the work until it is reduced to the proper transverse cross sectional diameter at various points.

The invention having been set forth what is claimed as new and useful is:

1. In a duplicating attachment for lathe having a carriage movable longitudinally of the bed of said lathe, a cross slide having transverse movement on said carriage, a compound rest mounted to swivel to any adjusted position on said cross slide for positioning a tool slide for movement in any desired angular direction relative to the carriage and cross slide movements, and a tracer controlled servomechanism including a tracer operable to actuate said tool slide upon the longitudinal feeding movement of said carriage, a template engaging feeler on said tracer, and a template to operatively engage said feeler, means for supporting said template on said compound rest comprising a guide bracket pivotally connected to said compound rest, a template engaging guideway in said bracket, and means for clamping said bracket to said compound rest to position said guideway parallel to the carriage movement so as to limit freedom of relative movement of said template and compound rest to a direction parallel to the longitudinal feeding movement of said carriage, and means for supporting another portion of said template on said bed comprising a member fixed to the bed, a template cross slide transversely movable on said member relative to the bed ways, and means to lock said template to said template cross slide member so as to limit freedom of relative movement of said template and bed to a direction transverse to the longitudinal feeding movement of said carriage.

2. In a tracer controlled form lathe having a bed, a carriage movable longitudinally of said bed, a cross slide on said carriage, a tool slide movably mounted in a swivelling mounting means supported on said cross slide for setting the tool slide movement to any desired angular direction of movement relative to the axis of a work piece in said lathe, a servomechanism including tracer control valve mounted on said tool slide, and template control means for said tracer valve including a template, a template bar carrying said template, a pivotal mounting connection for said template bar on said swivelling mounting means comprising, a clamping means for locking out the pivotal effect of said connection, and a guide means to support said template bar so as to limit freedom of relative movement of said template and said swivelling mounting means and cross slide to a direction parallel to the longitudinal carriage movement, and means for supporting another portion of said template in a predetermined fixed longitudinal position on said bed including a guide for freedom of relative movement of said template and bed to a direction transverse to the carriage movement.

3. In a duplicating attachment for a lathe having a bed, a carriage movable longitudinally on said bed, means for actuating said carriage in feeding movement, a cross slide mounted for transverse movement on said carriage, a sub-compound pivotally mounted to swivel on said cross slide to any angular position relative to the work spindle axis of said lathe, means for locking said sub-compound to said cross slide in the selected angular positions, and a tool slide reciprocably mounted on said sub-compound, a tracer controlled servomechanism for actuating said tool slide comprising, an actuating motor interconnected between said tool slide and said sub-compound, a tracer mounted on said tool slide and connected to said motor to control the operation thereof, a template, and means to support said template in operative engagement with said tracer during longitudinal movement of said carriage for any angular position of said sub-compound and any transverse position of said cross slide including, a longitudinal guide support, a pivotal connection for said support on said sub-compound to allow angular positioning of said sub-compound and guide support, a clamping device to lock said longitudinal guide support rigidly to said sub-compound when in selected angular position, and guideway means in said support engaging said template allowing freedom of relative longitudinal movement of said sub-compound and said template upon movement of said carriage, a transverse guide support for said template comprising a bed clamping member mounted on said bed, and a transversely movable template cross slide, and means to clamp said template to said template cross slide to hold said template in a predetermined fixed longitudinal position relative to said bed for any position of said cross slide.

4. In a duplicating attachment for a lathe having a bed, a carriage longitudinally reciprocatably mounted on said bed, a cross slide transversely movable on said carriage, a swivel slide mounted on said cross slide, a tool slide reciprocatably mounted on said swivel slide, a template guide member pivotally mounted on said swivel slide, means for rigidly clamping said template guide member to said swivel slide, a template bar, guide means in said template guide member for supporting said template bar for relative longitudinal sliding movement in the guide member, a bed bracket, means for clamping said bracket to said bed, means for connecting an end of said template bar to said bed bracket to hold said template bar against longitudinal movement relative to said bed including a slide member movable on said bed bracket in a direction at right angles to the direction of longitudinal relative movement of said template bar in said template guide member, a tool slide actuator interconnected between said tool slide and said swivel slide for reciprocating said tool slide, a tracer mounted on said tool slide for controlling the application of power to said actuator, and a tracer stylus on said tracer adapted to be engaged and actuated by a template on said template bar as said template bar moves longitudinally in said template guide member.

ARTHUR P. WATERSON.

REFERENCES CITED

The following references are of record in the file of this patent:

UNITED STATES PATENTS

| Number | Name | Date |
|---|---|---|
| 1,195,293 | Townsend | Aug. 22, 1916 |
| 1,289,674 | Coradi | Dec. 31, 1918 |
| 2,401,422 | Hamilton | June 4, 1946 |
| 2,437,570 | Von Zelewsky | Mar. 9, 1948 |